Patented Mar. 8, 1949

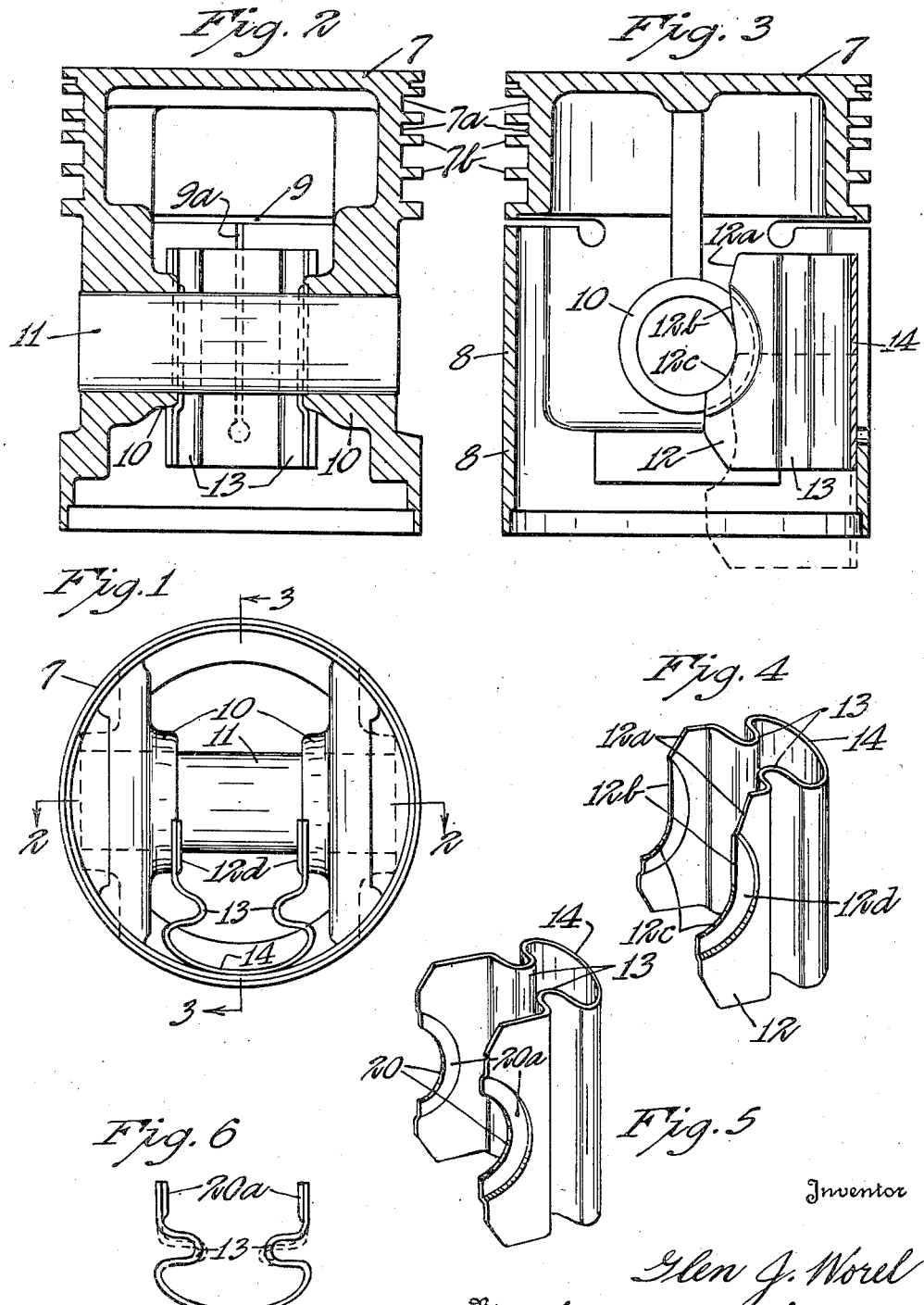

2,463,667

UNITED STATES PATENT OFFICE 2,463,667

DRIVE-IN TYPE PISTON EXPANDER

Glen J. Worel, Minneapolis, Minn., assignor to Thexton Manufacturing Company, Minneapolis, Minn., a corporation of Minnesota Application September 14, 1946, Serial No. 697,004

6 Claims. (Cl. 309—12)

This invention relates to expanders for the skirts of pistons of internal combustion engines and particularly to an expander especially adapted for pistons having relatively short wrist pin bosses such as those utilized in the motors of automobiles manufactured by Ford Motor Co., Buick Division of General Motors Corp. and Dodge Division of the Chrysler Corporation.

When the cylinders of internal combustion engines become worn, they develop, because of the connecting rod driving principle, out-of-round shape and the skirts of the pistons working in such worn cylinders, tend to slap against the cylinder walls producing a resultant slight tilting of the piston during its working stroke, which quickly wears the edges of the oil rings causing oil to pump past the rings and causing the efficiency of the engine to drop materially.

Piston expanders of numerous types, applied interiorly of the resilient skirt of a piston, have been extensively utilized. A number of these have been of the leaf spring or "shell type" wherein the resilient piston expander was interposed between the wrist pin or wrist pin bosses and the interior peripheral wall of the piston skirt, exerting an outward pressure on a portion of the skirt disposed intermediately of the wrist pin bosses. Examples of such "shell type" expanders are disclosed in my United States Letters Patent No. 2,355,937, granted August 15, 1944, and in my pending application, S. N. 356,608, filed September 13, 1940, now Patent No. 2,442,834, granted April 8, 1948.

Shell type expanders, such as shown in my said patent and patent application, have for the most part been interposed between the relatively elongated wrist pin bosses and the piston skirt, provided with legs, the extremities of which bear against the wrist pin bosses. In such constructions, insertion of the expander has been facilitated by spreading apart the legs with a pliers or suitable tool during installation, thereby decreasing the overall height of the same and making installation easy.

With several types of internal combustion engines now extensively utilized, the wrist pin bosses are so short that adequate spreading of the legs of the expander to facilitate insertion, is impossible.

It is an object of my present invention to provide a simple, highly efficient shell type piston expander which may be very quickly and accurately driven into place from the lower end of the piston, longitudinally thereof and which is interposed between the wrist pin proper and the piston skirt, but which has preferably, locking connection when driven completely to place with the ends of the wrist pin bosses.

A further object is the provision of a "drive in" type of piston expander wherein the driving action for installation will never cause expansion of the piston skirt beyond the normal amount present when the expander is in place.

A still further object is the provision of a piston expander of the class described, having efficient provision for compensation for expansion and contraction of the piston for wide temperature variations.

These and other objects and advantages of my invention will be more apparent from the following description made in connection with the accompanying drawings, wherein like reference characters refer to similar parts throughout the several views and in which:

Fig. 1 is a bottom plan view of a piston of the "short wrist pin boss" type, as shown, having an embodiment of my invention applied thereto;

Fig. 2 is a vertical section taken on the line 2—2 of Fig. 1;

Fig. 3 is a vertical section taken on the line 3—3 of Fig. 1, the dotted lines indicating the original position of the expander before being driven into place; and Fig. 4 is a perspective view showing an embodiment of the expander detached; and Figs. 5 and 6 are perspective and bottom plan views respectively, of a modified form of my invention, detached.

In the drawings, a piston of the short boss type, previously herein referred to, is illustrated having mounted therein an embodiment of my invention. The piston has the usual domed head 7, the periphery of which is provided with the usual piston ring grooves 7a and lands 7b. The head in conventional fashion, is constructed of greater thickness than the depending skirt 8 which is continuous and integral with the head, being outwardly and circumferentially offset somewhat from the inner periphery of the head. The skirt 8, in the type of piston illustrated, is constructed of resilient, somewhat flexible material and may have a T-slot therein which includes a circumferential slot 9 extending through the greater portion of the upper part of the skirt and intersected by a vertical slot 9a, which is disposed intermediate of the wrist pin bosses 10. The lower portion of the skirt is not slotted as in some other types of internal combustion engine pistons.

The usual short type, opposed wrist pin bosses 10 of relatively heavy construction, are integrally formed with the inner walls of skirt 8 and are bored and smoothly ground to act as bearings for the wrist pin 11. The wrist pin bosses 10, in the type of piston illustrated, are integrally formed with reinforced, substantially rigid struts, cast or otherwise formed in the inherent construction of the piston.

My improved piston skirt expander is adapted to apply pressure and expand the portion of the piston skirt extending about the slots 9 and 9a, intermediately of wrist pin bosses 10 and at one side of the piston. My expander is equally applicable to slotted or unslotted pistons and is particularly conceived for installation and operation upon a piston, wherein little space is provided between the opposing struts or walls from which the wrist pin bosses protrude.

My improved expander comprises a relatively very wide shell or leaf spring member curved into the general form of a U in cross section and having the relatively wide leg portions 12 which extend in substantially parallel relationship from inwardly folded temperature compensation portions 13 of the structure. My expander is preferably constructed from a relatively thin sheet of spring steel or the equivalent and after shaping, is tempered to properly perform its expansive function.

The expander is shaped to form a convex, medial, pressure-applying area or zone 14 which is preferably the full width of the expander and is, in operation, applied against the inner wall of the piston skirt at an area intermediate of the wrist pin connections. The two temperature compensation folds 13 are disposed intermediately of the pressure-applying portion 14 and the longitudinal edges of legs 12 and said folds are opposed and extend parallel with the longitudinal center line of the pressure-applying portion.

My expander is adapted to be longitudinally driven into operative position in the piston from the bottom thereof, being in external configuration, in the nature of a plug with its edges at the free ends of the legs 12 being formed for wedge effect during such driving action, and for subsequent locking with the ends of the wrist pin bosses when driven properly into place. To this end, the relatively very wide or longitudinal edges at the ends of legs 12, are shaped in the manner clearly shown in Figs. 3 and 4. The entering or upper portions of the said edges of the legs are diagonaled for a short distance to facilitate insertion of the expander for driving into place, forming the inclined portions 12a which are adapted to engage against the wrist pin 11 just inwardly of the opposed wrist pin bosses 10 to properly guide the expander for installation. The intermediate portions of the end edges of legs 12 for some distance, are straight as indicated by the numeral 12b, disposed in parallel relation to the pressure-applying portion 14 and thereafter, said edges are outwardly and arcuately curved along portions 12c adapted to conform to the circumference of the wrist pin 11 and to be seated against the lower side of said wrist pin.

The stock of material at the marginal portions of said edges adjacent sections 12b and 12c is offset inwardly from the legs 12 to form arcuate locking shoulders 12d which have an important relation after the expander has been driven into place. The said offset or recessed locking portions 12d nicely fit the ends or extremities of the wrist pin bosses 10 whereby when sprung into place, the expander will be locked against displacement through reciprocations or jars during operation of the engine.

To install my improved expander in pistons of the type illustrated, the legs 12 are slightly sprung towards each other and the expander is inserted upwardly, starting with the dotted line position shown in Fig. 3, where the inclined portions 12a of the wide end edges of the legs contact against the wrist pin proper with the legs disposed just inwardly of the wrist pin bosses. The expander may then be driven upwardly longitudinally of the piston and when fully driven to place, as shown in full lines in Fig. 3, the edge portions 12b and 12c conform to the wrist pin contour and the recessed or offset locking portions 12d of the two legs engage the ends of the wrist pin bosses being complementarily shaped thereto, locking the expander against accidental downward displacement. This locking action is due to the fact that the arcuate offset marginal portions 12d extend beyond the horizontal diameters of the wrist pin bosses and therefore, releasably lock with annular ends of the said bosses.

In the insertion of the expander longitudinally of the piston, the skirt is never expanded beyond the normal amount present when the expander is in place, due to the fact that the transverse, elongated edges at the ends of the legs are formed as illustrated and described, with the entering portions thereof inclined and thereafter cut on lines of tangency to the engaged periphery of the wrist pin. During insertion, the legs are flexed slightly inward at their extremities until the expander is driven into the seated position at which time, the offset, arcuate marginal portions 12d spring into locking relation with the ends of the wrist pin bosses. When so seated arcuate shoulders of portions 12d furnish thrust-applying seats so that undue wear is not placed upon the wrist pins through engagement of the transverse edges of the legs with the wrist pin. In other words, when seated, not only do the extreme transverse edges of the expander legs engage the wrist pin, but a base of resistance is provided by the extremities of the wrist pin bosses 10 through the engagement of the arcuate, shouldered offset portions 12d of the legs.

The opposed, inwardly extending, intermediate folds 13 in my expander provide an efficient means for assuring proper functioning of the expander regardless of expansion and contraction of the piston parts due to wide temperature variations during the operation of the engine. The walls and wrist pin bosses of the piston are usually constructed from alloy materials having a co-efficient of expansion considerably greater than spring steel from which the expander is constructed. Thus, unless provision is made for compensation for such expansion during the range of temperatures present in normal combustion engines from the starting point to operation at high speed, considerably greater pressure on the piston skirt would be applied when the temperature is materially raised.

With my improved structure, the inward opposed, intermediate folds 13 offer such flexibility to the expander that substantially the same pressure is applied from the intermediate pressure-applying area 14 when the bosses 10 and skirt are expanded during maximum temperature as when the motor is cool. This is an important function and advantage and in extensive actual use, has demonstrated high efficiency.

In the modification of my invention illustrated in Figs. 5 and 6, the structure for the most part, is identical with that of the preferred form described. The main difference in the two forms is that the embodiment of Figs. 5 and 6 does not constitute a "drive in" expander but has the transverse edges of the legs at both sides of the pressure-applying center line, symmetrically formed. Thus, intermediately and substantially centrally of the said transverse edges, arcuate recesses 20 are formed for conformance to the cylindrical shape of the wrist pin 11. The marginal portions about said recesses are offset at 20a in the manner of the arcuate marginal portions 12d of the preferred form. The offsetting of said portions is inwardly to accommodate and shoulder the extremities of the wrist pin bosses 10 in the manner of the preferred form.

In this second form, the expander cannot be driven in but may be conveniently installed by use of a special pair of pliers having thin, elongated jaws which are simultaneously inserted above and below the opposed inward folds 13, whereafter the folds are compressed together, lessening the height of the expander, as indicated by the dotted lines in Fig. 6, to an extent where clearance of the entering, straight edge portions of the transverse edges of the legs from wrist pin 11, is made possible. When properly installed or centered, the pliers are released and the expander seats with the shouldered or offset portions 20a locking with the ends of the wrist pin bosses 10. When so installed, the expander is locked as in the preferred form and the inward folds 13 serve the same function in compensating for temperature variations of the motor during operation.

It will, of course, be understood that various changes may be made in the form, details, arrangement and proportions of the parts without departing from the scope of my invention.

What I claim is:

1. A piston expander for an internal combustion engine piston of the type having opposed, substantially cylindrical wrist pin bosses, a cylindrical wrist pin journaled therein and an annular, depending piston skirt of resilient material, comprising; a substantially straight, spring shell member of general U-shape cross section, having a medial curved portion adapted to apply pressure against the resilient skirt of a piston and having substantially straight legs terminating in elongated, transverse edges adapted to overlie the wrist pin of a piston, said spring member being adapted for insertion from the bottom of the piston longitudinally thereof, said elongated wrist pin-overlying edges including an entering portion for each edge converging to an intermediate, wider portion of the leg, the intermediate portion of each edge being arcuately curved to conform to the lower peripheral shape of the wrist pin, the legs of said expander at the arcuately curved portions of said edges being inwardly offset along partial, circular zones to engage the ends of said bosses when the expander is driven into place and to so lock said expander against accidental displacement.

2. A piston expander for an internal combustion engine piston of the type having opposed, substantially cylindrical wrist pin bosses, a cylindrical wrist pin journaled therein and an annular, depending piston skirt of resilient material, comprising; a substantially straight, spring shell member of general U-shape cross section, having a medial curved portion adapted to apply pressure against the resilient skirt of a piston and having substantially straight legs terminating in elongated, transverse edges adapted to overlie the wrist pin of a piston, said spring member being adapted for insertion from the bottom of the piston longitudinally thereof, said transverse edges having curved recessed portions adapted to conform to the lower peripheral shape of the wrist pin to lock the expander thereon when installed and the legs of said expander having opposed, inwardly extending U-shaped folds adapted to provide compensation for expansion of the parts of the piston when the motor is operated at high temperatures, said folds further being adapted to be simultaneously engaged and pressed together by a tool to lessen the over-all height of the expander to facilitate installation.

3. A piston expander for an internal combustion engine piston of the type having opposed, substantially cylindrical wrist pin bosses, a cylindrical wrist pin journaled therein and an annular, depending piston skirt of resilient material, comprising; a substantially straight, spring shell member of general U-shape cross section, having a medial curved portion adapted to apply pressure against the resilient skirt of a piston and having substantially straight legs terminating in elongated, transverse edges adapted to overlie the wrist pin of a piston, said spring member being adapted for insertion from the bottom of the piston longitudinally thereof, said transverse edges having curved recessed portions adapted to conform to the lower peripheral shape of the wrist pin to lock the expander thereon when installed and the legs of said expander having opposed, inwardly extending folds, said folds each being defined by a pair of spaced, resiliently connected flanges extending substantially parallel with said medial pressure-applying portion and being adapted to be simultaneously engaged and pressed together by a tool applied interiorly of the expander to lessen the overall height of the expander to facilitate installation.

4. A piston expander for an internal combustion engine piston of the type having opposed, substantially cylindrical wrist pin bosses, a cylindrical wrist pin journaled therein and an annular, depending piston skirt of resilient material, comprising; a substantially straight, spring shell member of general U-shape cross section, having a medial curved portion adapted to apply pressure against the resilient skirt of a piston and having substantially straight legs terminating in elongated, transverse edges adapted to overlie the wrist pin of a piston, said spring member being adapted for insertion from the bottom of the piston longitudinally thereof, said transverse edges being formed throughout a portion of their lengths to afford close clearance with the periphery of said wrist pin during installation and being formed throughout a portion of their lengths with curved portions for partially surrounding said wrist pin, the intermediate marginal portions of said edges being offset inwardly along arcuate areas to engage against the ends of said bosses when properly installed and to provide arcuate shoulders overlying the cylindrical ends of said bosses whereby the expander is locked into place to prevent displacement during operation of the piston.

5. A "drive in" type piston expander for a piston of the type having opposed, annular, wrist pin bosses with a wrist pin therein and also having a depending resilient piston skirt, comprising; a spring shell member of general U-shaped cross section having an intermediate longitudinal portion for applying pressure against the piston skirt and having spaced flanges constituting legs extending inwardly from said intermediate portion, said legs terminating in edges having recesses for accommodating the wrist pin of a piston and marginal portions of said edges at said recessed portions being offset inwardly along arcuate zones to provide annular shoulders partially embracing the upper portions of said wrist pin bosses to lock said expander when driven into place against incidental displacement.

6. A "drive in" type piston expander for a piston of the type having opposed, annular, wrist pin bosses with a wrist pin therein and also having a depending resilient piston skirt, comprising; a substantially straight, channel shaped, spring shell member having a medial, longitudinal portion adapted to apply pressure against the piston skirt and having spaced legs extending inwardly from said pressure applying portion, said legs terminating in parallel edges, said edges having transversely aligned curved recesses for accommodation of the wrist pin of the piston, the said recessed portions of said edges being marginally and inwardly offset relative to said legs along curved zones to fit the ends of said wrist pin bosses and to provide arcuate shoulders locking said expander with said wrist pin bosses when said expander is driven into place.

GLEN J. WOREL.

REFERENCES CITED

The following references are of record in the file of this patent:

UNITED STATES PATENTS

| Number | Name | Date |
| --- | --- | --- |
| 2,258,476 | Wherry | Oct. 7, 1941 |